United States Patent
Curtin (10) Patent No.: US 8,871,092 B2
(45) Date of Patent: *Oct. 28, 2014

(54) COLLAPSIBLE COLANDER AND BOWL

(75) Inventor: Heather Curtin, Duarte, CA (US)

(73) Assignee: Progressive International Corporation, Kent, WA (US)

( * ) Notice: Subject to any disclaimer, the term of this patent is extended or adjusted under 35 U.S.C. 154(b) by 1150 days.

This patent is subject to a terminal disclaimer.

(21) Appl. No.: 12/724,112

(22) Filed: Mar. 15, 2010

(65) Prior Publication Data

US 2010/0170840 A1      Jul. 8, 2010

Related U.S. Application Data

(63) Continuation of application No. 11/690,045, filed on Mar. 22, 2007, now Pat. No. 7,678,271.

(51) Int. Cl.

| | | |
|---|---|---|
| *B01D 39/16* | (2006.01) | |
| *B01D 35/00* | (2006.01) | |
| *B01D 29/085* | (2006.01) | |
| *B01D 29/37* | (2006.01) | |
| *B01D 35/28* | (2006.01) | |
| *B65B 39/02* | (2006.01) | |
| *B67C 11/00* | (2006.01) | |
| *B65D 8/14* | (2006.01) | |
| *B65D 6/16* | (2006.01) | |
| *B65D 6/18* | (2006.01) | |
| *A47J 43/22* | (2006.01) | |
| *A47J 43/24* | (2006.01) | |

(52) U.S. Cl.
CPC . *A47J 43/22* (2013.01); *A47J 43/24* (2013.01)

USPC ........... 210/232; 210/238; 210/249; 210/470; 210/471; 210/482; 210/474; 141/337; 220/666; 215/382

(58) Field of Classification Search
USPC ......... 210/232, 238, 249, 470, 471, 474, 482, 210/499; 220/666; 215/382
See application file for complete search history.

(56) References Cited

U.S. PATENT DOCUMENTS

| 1,016,249 A | 2/1912 | Comtois |
|---|---|---|
| 1,048,546 A | 12/1912 | Ketcham |

(Continued)

FOREIGN PATENT DOCUMENTS

| AU | 2007200570 A1 | 5/2008 |
|---|---|---|
| CA | 2245807 | 8/1997 |

(Continued)

OTHER PUBLICATIONS

"One Source for Silicone Innovation," Dexas International, Ltd; www.dexas.com; 1 page. 2006.

(Continued)

*Primary Examiner* — Thomas M Lithgow
(74) *Attorney, Agent, or Firm* — Lowe Graham Jones PLLC (57) ABSTRACT

A collapsible container consists of three parts: a rigid top rim, a flexible center band, and a rigid base. This combination of sections allows the container to easily collapse to about one-third of its original height. The container is also quite stable when expanded and is self-supporting. In various embodiments of the invention, for example, the upper rim may be expandable, the base may include holes or mesh to serve as a colander or strainer, or the base may be configured as a tube to function as a funnel.

11 Claims, 9 Drawing Sheets

(56) References Cited

U.S. PATENT DOCUMENTS

| | | |
|---|---|---|
| 1,247,006 A | 11/1917 | Reardon |
| 1,310,773 A | 7/1919 | Wills |
| 1,669,284 A | 5/1928 | Chetham |
| 1,675,855 A | 7/1928 | Kogler et al. |
| 1,688,846 A | 10/1928 | Andrews |
| 1,874,498 A | 8/1932 | Glenny |
| 1,950,378 A | 3/1934 | Andrews |
| 2,006,566 A | 7/1935 | Zimmer |
| 2,264,238 A | 11/1941 | Burdwood |
| 2,391,215 A | 12/1945 | Zabel et al. |
| 2,456,912 A | 12/1948 | Burrows |
| 2,464,921 A | 3/1949 | Chandler |
| 2,520,382 A | 8/1950 | Conrad et al. |
| 2,725,087 A | 11/1955 | Potter |
| 2,732,696 A | 1/1956 | Baker |
| 2,808,938 A | 10/1957 | Glover |
| D199,320 S | 10/1964 | Swett |
| 3,170,875 A | 2/1965 | Swett |
| 3,174,833 A * | 3/1965 | Blackmer ................. 422/108 |
| 3,220,544 A | 11/1965 | Lovell |
| 3,300,048 A | 1/1967 | Pollock |
| 3,578,415 A * | 5/1971 | Hiltz ........................ 422/166 |
| D237,032 S | 10/1975 | Montesi |
| 4,001,904 A | 1/1977 | Gill |
| D244,827 S | 6/1977 | Nevai |
| 4,075,105 A | 2/1978 | Steiner et al. |
| 4,147,277 A | 4/1979 | Bateman et al. |
| 4,220,534 A | 9/1980 | Perry |
| D259,535 S | 6/1981 | Daenen |
| 4,377,191 A | 3/1983 | Yamaguchi |
| 4,419,103 A | 12/1983 | Balkan |
| D272,972 S | 3/1984 | De Costar |
| D286,490 S | 11/1986 | Carlson |
| 4,622,146 A | 11/1986 | O'Brien |
| 4,873,100 A | 10/1989 | Dirksing et al. |
| 5,035,800 A | 7/1991 | Kopach |
| 5,226,551 A | 7/1993 | Robbins, III |
| D346,725 S | 5/1994 | Kolada |
| 5,384,173 A | 1/1995 | Akao et al. |
| 5,392,941 A | 2/1995 | Robbins, III |
| 5,417,337 A | 5/1995 | Robbins, III |
| D359,202 S | 6/1995 | Cousins et al. |
| 5,439,128 A | 8/1995 | Fishman |
| 5,533,638 A | 7/1996 | Robbins, III |
| 5,549,213 A | 8/1996 | Robbins, III et al. |
| 5,575,398 A | 11/1996 | Robbins, III |
| 5,584,413 A | 12/1996 | Jung |
| 5,632,406 A | 5/1997 | Robbins, III |
| 5,860,556 A | 1/1999 | Robbins, III |
| 5,900,293 A | 5/1999 | Zettle |
| 5,911,338 A | 6/1999 | Miller |
| 5,913,448 A | 6/1999 | Mann et al. |
| 5,992,676 A | 11/1999 | Tsai |
| 6,035,766 A | 3/2000 | Schirmer |
| 6,103,116 A | 8/2000 | Koslow et al. |
| 6,129,344 A | 10/2000 | Yang |
| D433,884 S | 11/2000 | Fujimoto |
| 6,158,620 A | 12/2000 | Polan |
| 6,202,542 B1 | 3/2001 | Melton |
| D444,039 S | 6/2001 | Tong |
| 6,315,151 B1 | 11/2001 | Hupp et al. |
| 6,364,152 B1 | 4/2002 | Poslinski et al. |
| 6,367,409 B1 | 4/2002 | Broom |
| D469,667 S | 2/2003 | Burton |
| 6,547,080 B1 | 4/2003 | Guard |
| 6,736,285 B2 | 5/2004 | Stewart-Stand |
| 6,758,348 B2 | 7/2004 | Adkins |
| 6,811,051 B2 | 11/2004 | Higuchi |
| D502,847 S | 3/2005 | Leonori |
| D503,313 S | 3/2005 | Shamoon |
| 6,949,190 B2 | 9/2005 | Hutzler |
| D514,764 S | 2/2006 | Kumagai |
| D522,809 S | 6/2006 | Kusuma et al. |
| D545,137 S | 6/2007 | Furlong et al. |
| 7,325,694 B2 | 2/2008 | Bushey |
| 7,678,271 B2 * | 3/2010 | Curtin ......................... 210/232 |
| 2003/0217649 A1 | 11/2003 | Leonori |
| 2005/0127073 A1 | 6/2005 | Kusuma et al. |
| 2005/0127074 A1 | 6/2005 | Kusuma et al. |
| 2006/0060522 A1 | 3/2006 | Bushey |
| 2006/0096929 A1 | 5/2006 | Repp et al. |
| 2007/0181489 A1 | 8/2007 | Lee |
| 2007/0251874 A1 | 11/2007 | Stewart |

FOREIGN PATENT DOCUMENTS

| | | |
|---|---|---|
| DE | 2904504 A * | 8/1980 |
| EP | 719708 | 7/1996 |
| EP | 1764017 | 3/2007 |
| EP | 1917890 | 5/2008 |
| GB | 2028675 | 3/1980 |
| JP | 62-004054 A * | 1/1987 |
| JP | 9-150833 | 6/1997 |
| JP | 09192031 | 7/1997 |
| JP | 09-287996 A * | 11/1997 |
| WO | 2006054168 | 5/2006 |
| WO | 2009023892 | 2/2009 |

OTHER PUBLICATIONS

"Strainer," Normann Copenhagen, Good Design 2005; www.normann-copenhagen.com; 1 page. Printed Jul. 13, 2006.

"Prepology Set of 3 Silicone Collapsible Colanders," QVC, www.qvc.com, 5 pages. printed Jul. 5, 2006.

"The Normann Collapsible Colander," Smart Stuff; www.smartstuff.se; 2 pages. Aug. 2005.

* cited by examiner

COLLAPSIBLE COLANDER AND BOWL

PRIORITY CLAIM

This application is a continuation of U.S. application Ser. No. 11/690,045 filed Mar. 22, 2007.

FIELD OF THE INVENTION

This invention relates generally to collapsible bowls, colanders, measuring cups, and strainers.

BACKGROUND OF THE INVENTION

Large kitchen items such as bowls and colanders can be difficult to store. They can take up to an inordinate amount of space in a kitchen cabinet or drawer, making it cumbersome to retrieve the item and replace it when finished.

In some instances, others have created collapsible containers to reduce the storage space required. But existing collapsible containers have several drawbacks. Some collapsible containers are made of a single material, generally a type of plastic, with multiple pleats. The design makes them very hard to expand and collapse because the material is relatively stiff and a substantial force is required. In some instances, collapsible strainers have been formed entirely from a flexible material. This design allows the item to be readily flattened, but because the material is so flexible it is not self-supporting and will just collapse when placed on a surface. Accordingly, there is a need for an improved collapsible container and strainer that can be easily collapsed and expanded and that is fully self-supporting on a surface.

SUMMARY OF THE INVENTION

The preferred collapsible container as discussed below consists of three parts: a rigid top rim, a flexible center band, and a rigid base. This combination of sections allows the container to easily collapse to about one-third of its original height. The container is also quite stable when expanded and is self-supporting. The top rim of the container can incorporate different types of handle shapes. The base can also have different kinds of shapes, such as cut away section for draining or non-skid feet.

In some examples of the invention, the container is a colander. In that form, the container base preferably includes holes to facilitate draining, but the center band and rim do not have holes.

In yet other examples, the container is a funnel, a strainer, or other item that generally includes a rigid rim and collapsible center section.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
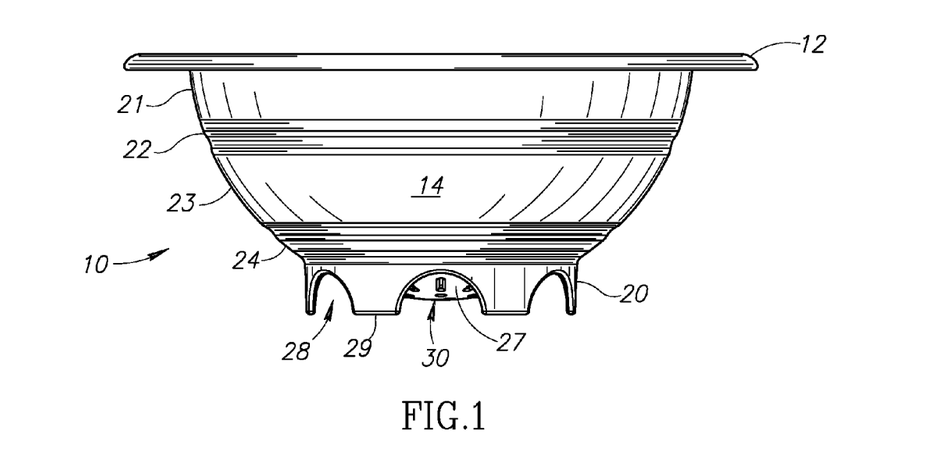
FIG. 1 is a side view of a preferred colander.

FIGS. 1-4 depict an example of a collapsible container which, in the form as shown, is a colander 10. FIG. 1 shows a side view of the colander 10, in which the colander 10 includes a substantially rigid rim 12 and a substantially rigid base 20, and a flexible center section extending between the base and the rim. The center section is a flexible membrane 14 attached to the base and the rim such that together the base, rim, and center membrane form the container. Preferably, the center section is formed from a single material extending between the rim and the base, and most preferably, the material is a food-grade material so that the container can be used with food items.

As shown, the membrane 14 includes a first relatively uniform section 21, a first folding section 22, a second relatively uniform section 23, and a second folding section 24. Each of the first and second relatively uniform sections is formed from flexible material having a substantially uniform thickness within the region of that section. The thickness and material is chosen to provide a sufficient degree of rigidity such that the container will not collapse under its own weight when extended into the position of FIG. 1. In some examples of the invention, the height of the central section is approximately half the height of the membrane overall.

In the preferred embodiment, the membrane 14 is formed from silicone and the base 20 and rim 12 are each formed from plastic, with the membrane being over-molded onto the rim and the base. The membrane may alternatively be formed from other flexible materials such as thermoplastic elastomers, and may be glued or otherwise adhered to the base and rim. Likewise, the rim and base may alternatively be formed from other rigid or semi-rigid materials such as metals.

The base 20 includes a convex or rounded portion 27 that serves as the bottom of the container 10. The bottom of the base need not necessarily be rounded, but it facilitates drainage in the form of a colander and is a preferred shape in the form of a bowl. The base also includes a peripheral rim defined by a plurality of feet 29 that are each separated by cut-away arches 28. The bottoms of the feet 29 are preferably lower than the outermost and lowest portion of the rounded portion 27, such that the bottom of the rounded portion 27 of the container is above and will not touch the floor of a sink or other horizontal surface on which the container is placed. This arrangement of the height of the feet helps to facilitate more rapid drainage of liquids from the colander. In other examples of the invention, the base has no feet, and may alternatively terminate in an annular rim or a substantially flat bottom.

Figure 2:
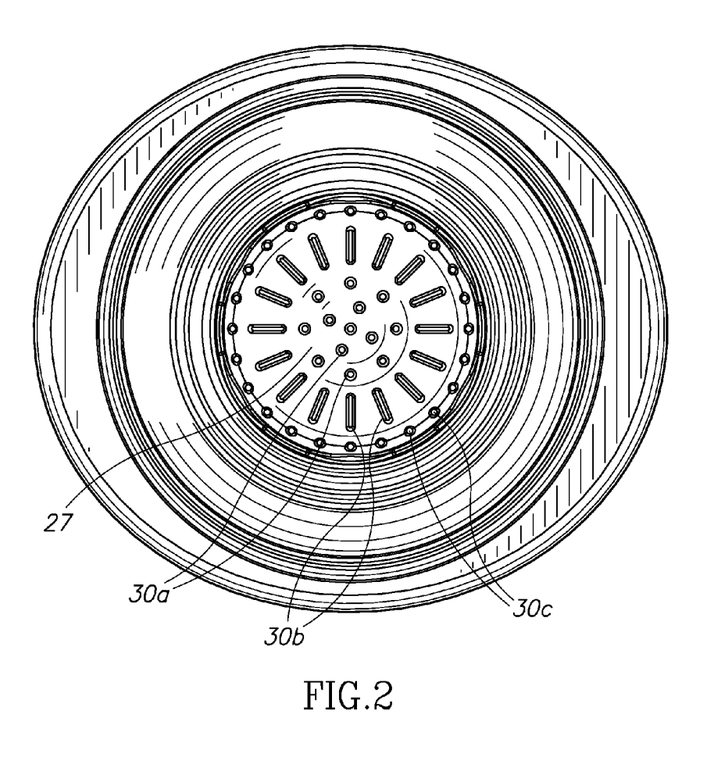
FIG. 2 is a top view of a preferred colander.

The base of the container includes a plurality of holes 30 to allow drainage when the container takes the form of a colander. As best seen in FIG. 2, the size, shape, and arrangement of the holes may vary. In one example, the base may include a first plurality of generally circular holes 30a and a second plurality of generally oval holes 30b. As shown, the circular holes 30a are positioned toward the center of the base while the second plurality of oval holes is distributed radially outward from the center. Optionally, a third plurality of circular holes 30c is provided adjacent an upper rim of the base.

Figure 3:
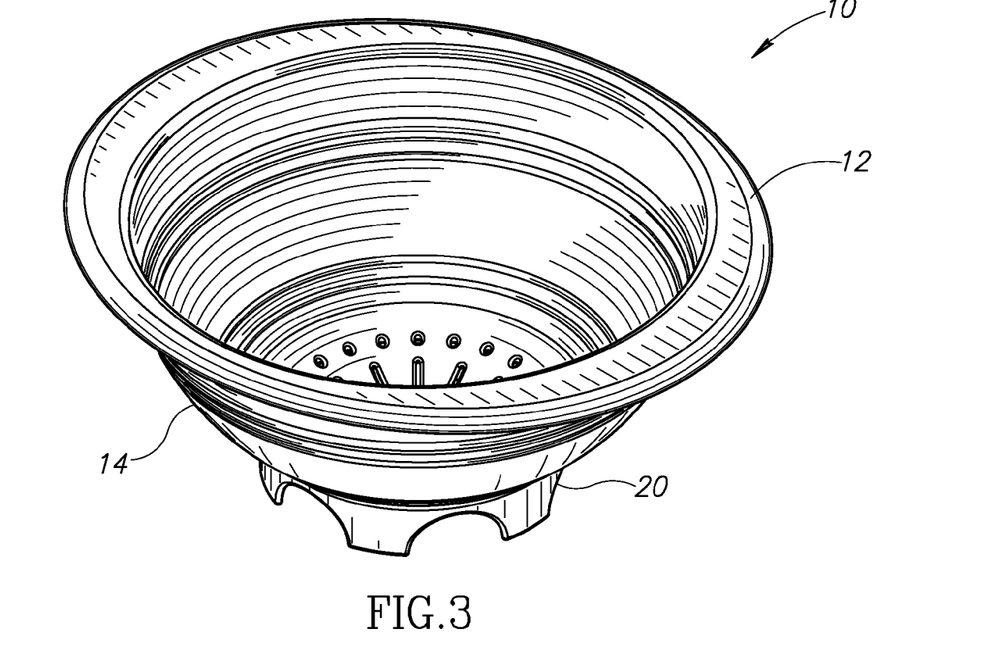
FIG. 3 is a perspective view of a preferred colander in an expanded position.
Figure 4:
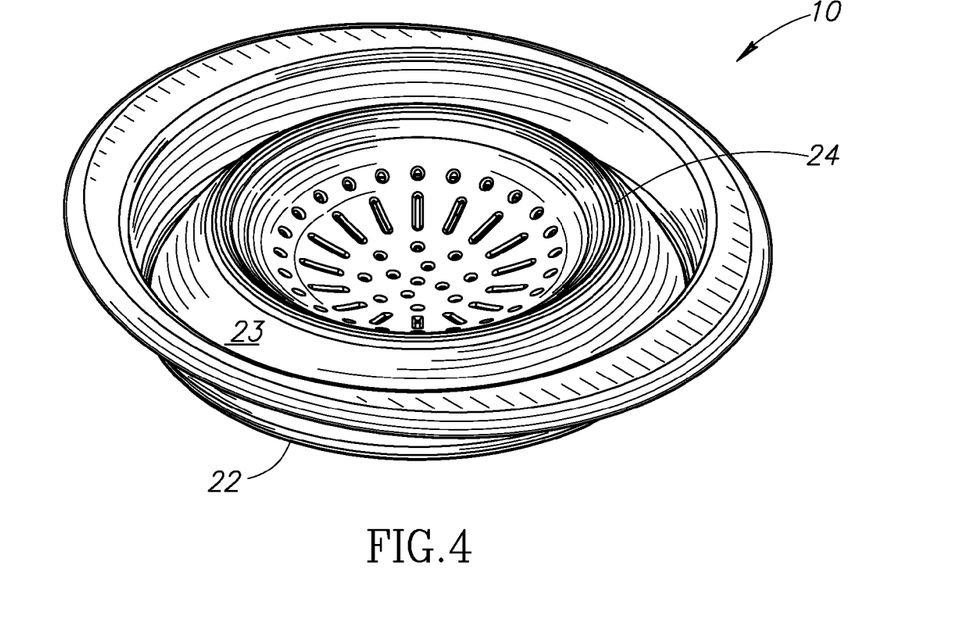
FIG. 4 is a perspective view of a preferred colander in a collapsed position.

As shown in FIGS. 1-3, the container (in this case a colander) can be expanded so that it is ready to accept food or other items. The holes within the base allow the liquid to drain from the bottom of the container. When not in use, as shown in FIG. 4, the container can be collapsed. In the collapsed position, the height of the container is much shorter than in the expanded position. In the most preferred example, the height of the container when collapsed is approximately one third of the height of the container when expanded. Each of the first and second folding sections 22, 24 has been folded in order to collapse the container. Thus, the membrane 14 has been folded upward along the first folding section 22 and downward along the second folding section 24. The first and second substantially uniform sections 21, 23 remain substantially uniform and not folded.

In alternate forms of the invention, the first uniform section 21 is substantially omitted, such that the membrane 14 is attached to the rim 12 at a location relatively close to the first folding section 22.

The first and second folding sections 22, 24 are created within the membrane 14 by forming one or more portions about the membrane that are more likely than the rest of the membrane to fold under force. In one example, each folding section includes several alternating convex and concave ridges about the entire perimeter of the membrane. Alternately, the folding sections may be regions of thinner material, may be scored, have surrounding thickened regions, or otherwise be fashioned to urge the membrane to fold in the vicinity of the folding region. In this fashion, each of the folding sections serves as a living hinge that is configured to be more willing to fold than the substantially uniform sections 21, 23.

In order to collapse the container, a force is applied at the rim 12, with the force generally being in the direction from the rim toward the base. To expand the container, a force is applied to urge the rim upward while holding the base generally stationary.

Figure 5:
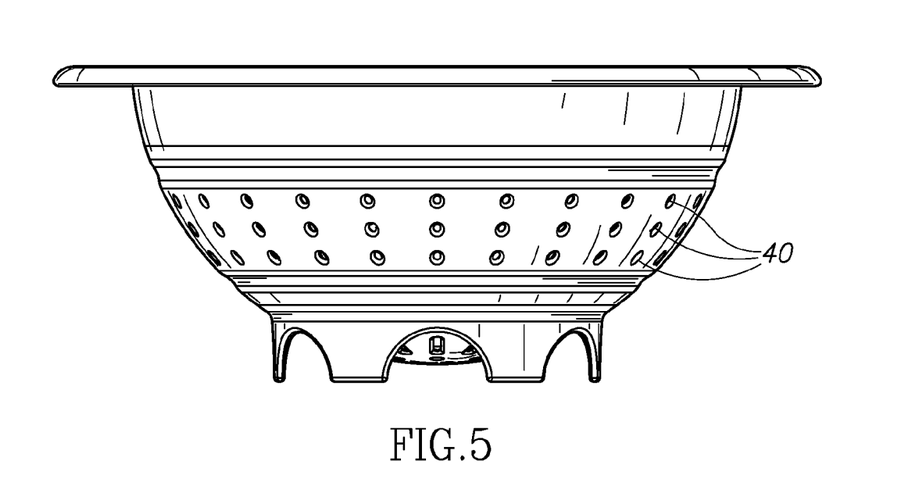
FIG. 5 is a side view of an alternate preferred colander.
Figure 6:
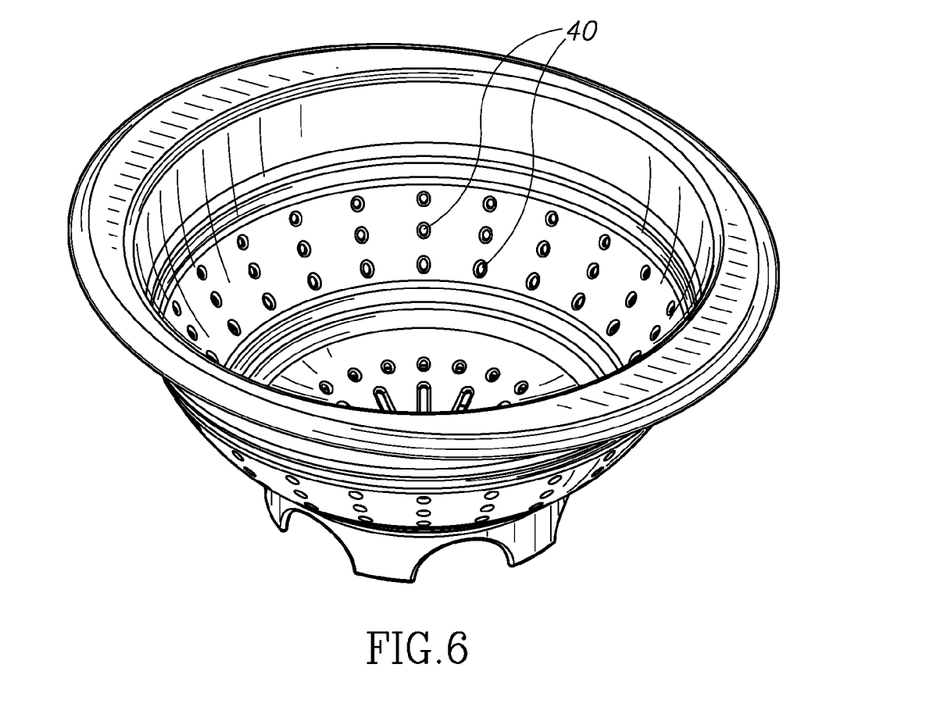
FIG. 6 is a perspective view of an alternate preferred colander.

In an alternate example, as shown in FIGS. 5 and 6, the membrane 14 may also include holes for drainage. In this example, the container is the same as in FIGS. 1-4 except that a plurality of drainage holes 40 is provided. Although the holes in the membrane are possible, the inventor has found that the inclusion of such holes adds an unnecessary complexity to the construction of the device, and further that the colander drains equally well without adding holes to the membrane.

Figure 7:
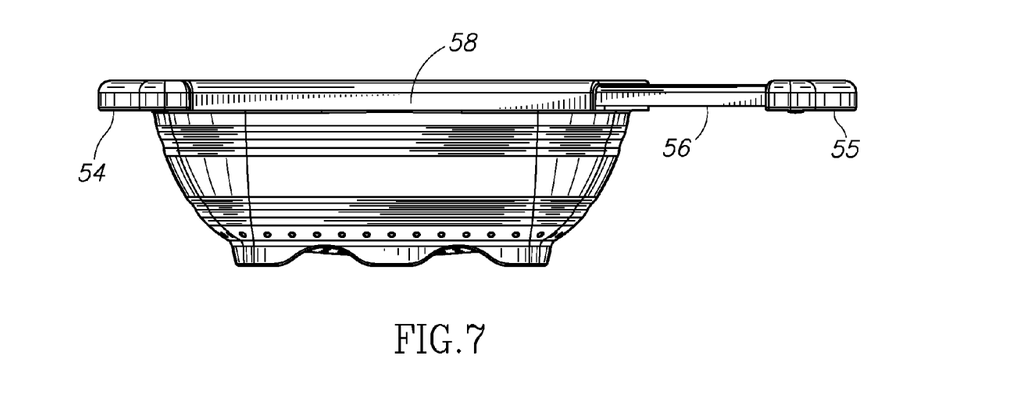
FIG. 7 is a side view of an over-the-sink collapsible colander.
Figure 8:
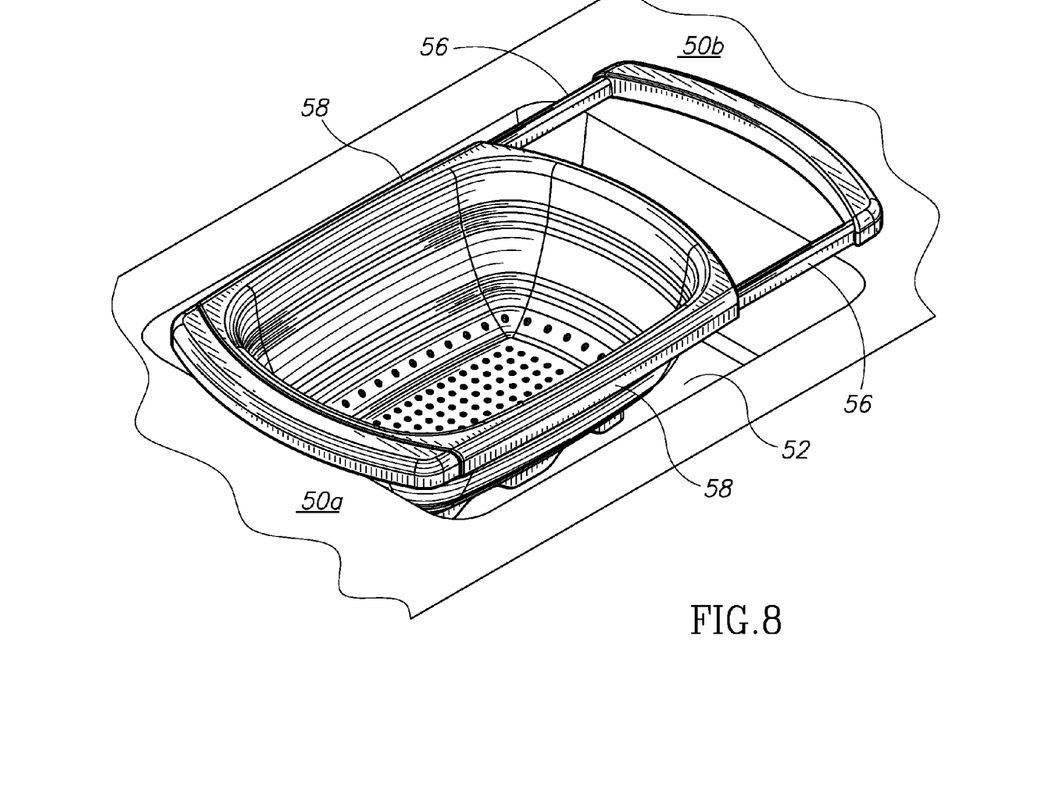
FIG. 8 is a perspective view of an over-the-sink collapsible colander.
Figure 9:
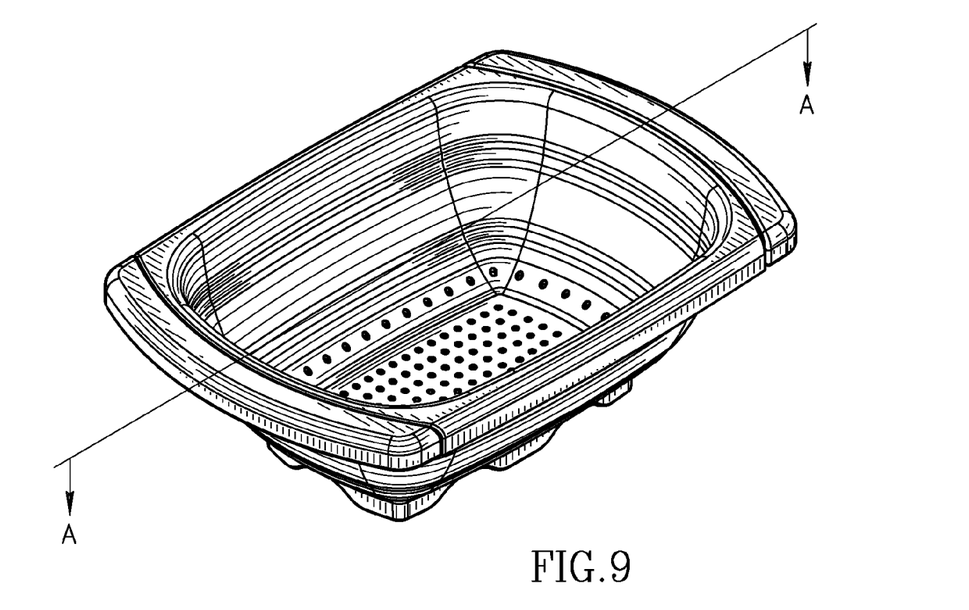
FIG. 9 is a perspective view of an over-the-sink collapsible colander, shown with a rim in a retracted position.

In yet another example, the collapsible container may be configured to enable the rim of the container to rest on the rim of a sink so that the colander is suspended over the sink. An example container of this type is shown in FIGS. 7-9. The container as shown includes a rim, central membrane, and base as described above with respect to FIGS. 1-4. The principal difference is that the rim is expandable to enable the container to be suspended over a sink 52. Thus, the rim includes a first side 54, a second side 55, and a pair of arms 56. The arms are slideably retained within sleeves defined by front and back portions of the rim 58, thereby allowing the width between the first side of the rim 54 and second side of the rim 55 to be adjusted to accommodate sinks of varying sizes.

As shown in FIG. 8, with the arms 56 extended to a desired width the first side of the rim rests on a first side of the counter top 50a (or sink rim) and the second side of the rim of the container rests on a second side of the countertop 50b (or sink rim). The container is thereby suspended above the sink to allow a user to place a large quantity of items into the container. Because this example also includes a plurality of drainage holes in the base as described above, it can be used as a colander, with water from a faucet being used to rinse food items such as fruits and vegetables.

When finished using the over-the-sink version of the invention, the arms are retracted as shown in FIG. 9. The container can also be collapsed as described above and illustrated in FIG. 4. In alternate examples, the expandable arms may be telescoping, folding, or otherwise configured to extend from a retracted to an extended position.

Figure 10:
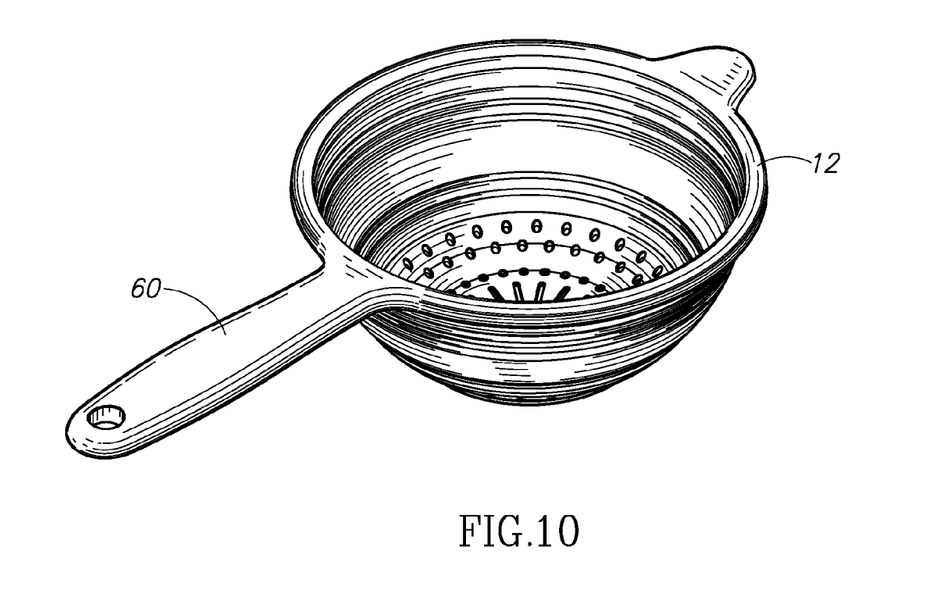
FIG. 10 is a perspective view of a preferred colander with handle.

Another example of the invention is shown in FIG. 10. In this example, the container includes a handle 60 attached to the rim, in this case by forming the rim with an integral handle. While such a handle may be attached to any version of the invention, it is most useful for somewhat smaller container sizes in which the user can hold the container by the handle while draining items placed within the container. Other than the handle 60, the container as illustrated in FIG. 10 is otherwise functionally similar to the container of FIGS. 1-4.

Figure 11:
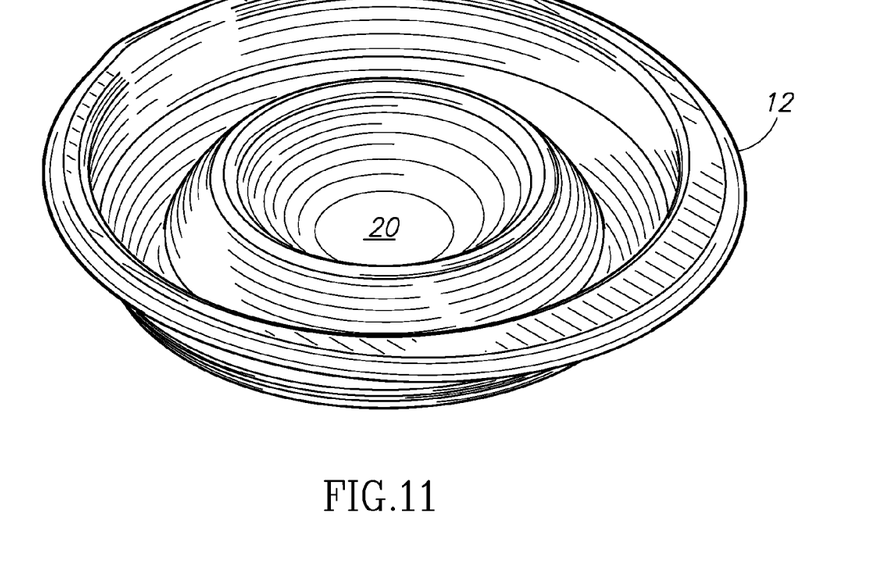
FIG. 11 is a perspective view of a preferred collapsible bowl in a collapsed position.
Figure 12:
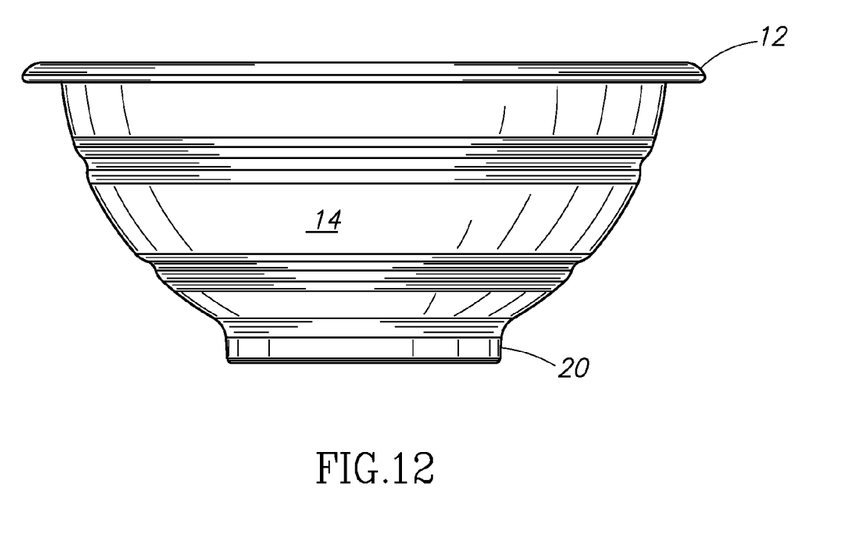
FIG. 12 is a side view of a preferred collapsible bowl in an expanded position.

In some forms of the invention, the base does not include drainage holes. Such an example of the invention is shown in FIGS. 11 and 12. In this form, the container is a bowl rather than a colander, and therefore the base 20 does not include holes. Because it is not functioning as a colander, the base 20 also need not include arched portions, but rather can simply include a circular foundation configured to rest on a surface. The central membrane is configured to be collapsible as described above with respect to FIGS. 1-4, such that the bowl can be collapsed as shown in FIG. 11 or expanded as shown in FIG. 12.

Figure 13:
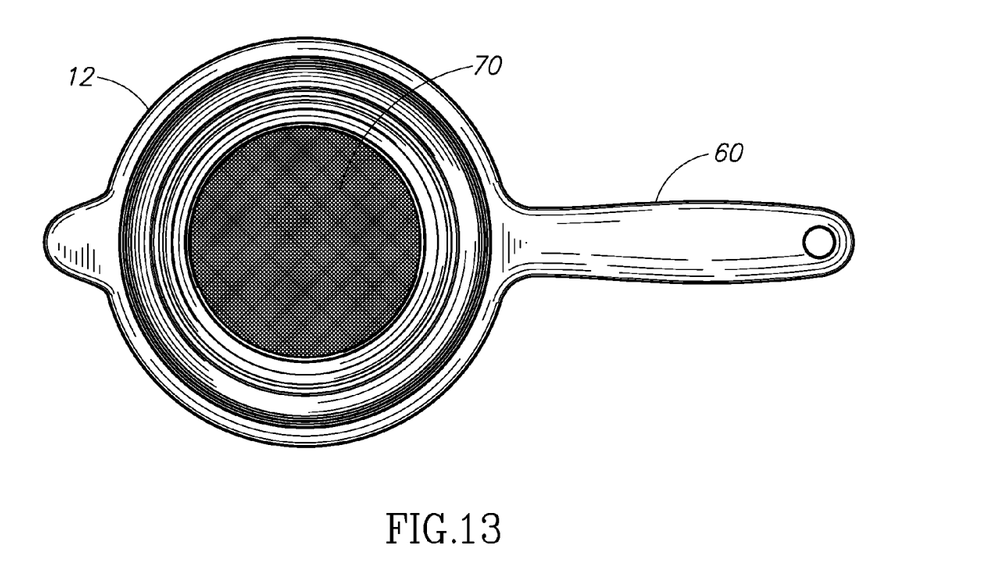
FIG. 13 is a top view of a preferred collapsible strainer.
Figure 14:
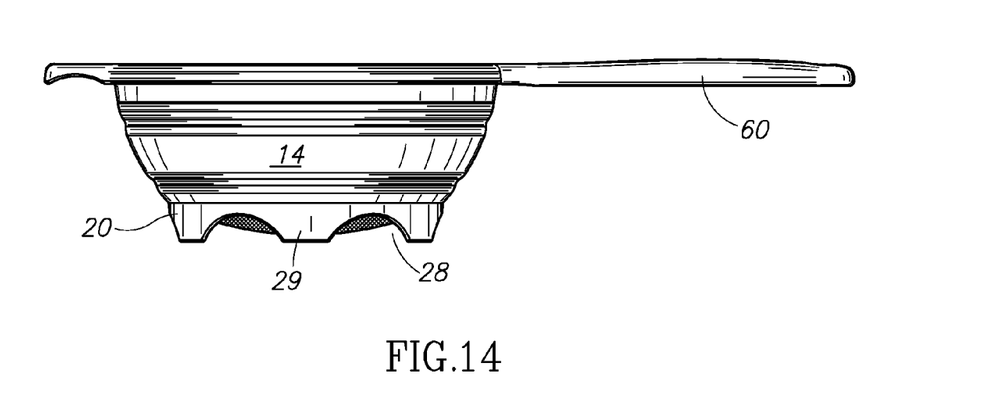
FIG. 14 is a side view of a preferred collapsible strainer.

Instead of relatively large drainage holes within the base, the base may include a metal or other mesh material so that the container is adapted for use as a strainer rather than a colander. An example of this form of the invention is shown in FIGS. 13 and 14, in which the container includes an upper rim 12, a handle 60, a central membrane 14, and a base 20. The base in this case includes a ring formed of substantially rigid plastic, with mesh material 70 secured to the ring and filling the area within the ring. The mesh is preferably a metal wire mesh, but may alternatively be formed from other materials.

As best seen in FIG. 14, the outer portion of the base 20 may optionally include a plurality of peripheral feet 29 and cut-away arches 28, in the manner as described with respect to FIG. 1. The strainer is collapsible in the manner of the other containers described above, by including a flexible membrane with a living hinge.

Figure 15:
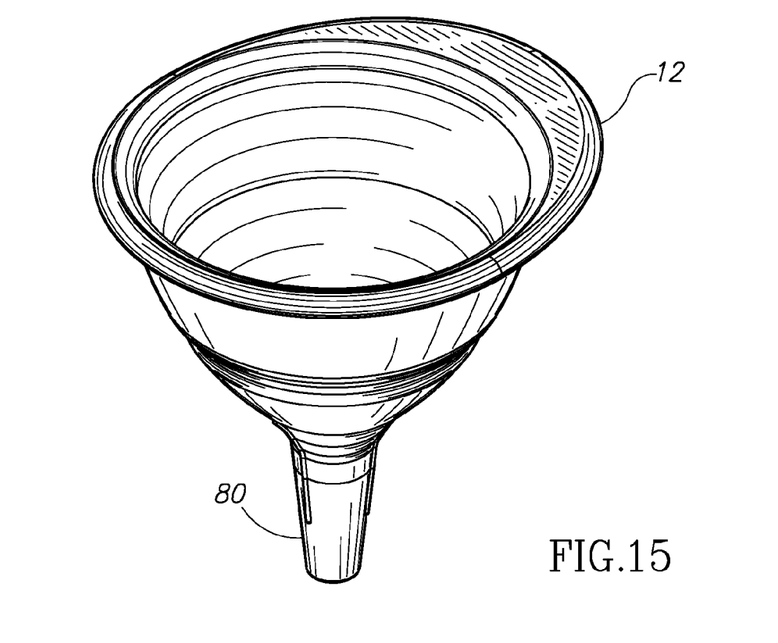
FIG. 15 is a perspective view of a preferred collapsible funnel.
Figure 16:
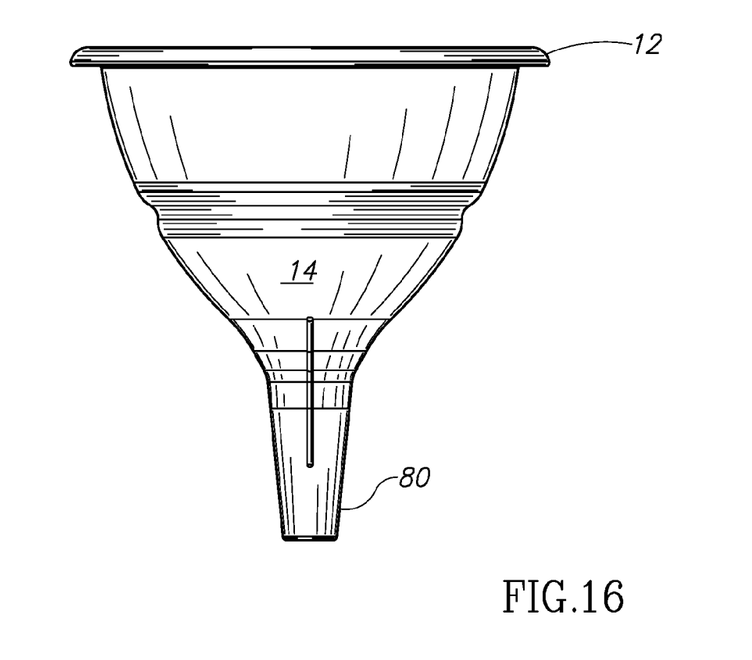
FIG. 16 is a side view of a preferred collapsible funnel.

An additional example of the invention is illustrated in FIGS. 15 and 16. In this example, the container is a funnel defined by an upper rim 12, a flexible central membrane 14, and a base 80. The base of the funnel is substantially tubular, in which the diameter of the tubular base is much smaller than that of the upper rim. The funnel is collapsible in the manner of the other containers described above, by including a flexible membrane with a living hinge.

Figure 17:
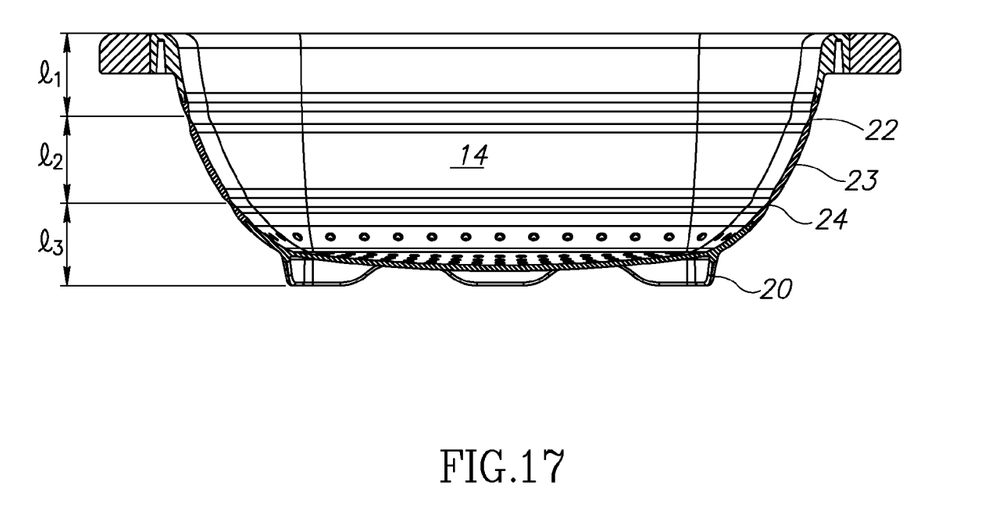
FIG. 17 is a cross-sectional view of a collapsible container, taken along the lines A-A from FIG. 9.

FIG. 17 is a cross-sectional view of a collapsible container, in this case the container depicted in FIG. 9. Accordingly, the view of FIG. 17 is taken along the line A-A from FIG. 9. Each of the collapsible containers described above has a similar cross-sectional construction, however, and therefore this image is intended to also be generally representative of the other embodiments described above.

As shown, the collapsible container includes a flexible membrane 14 having a first folding section 22, a relatively uniform section 23, and a second folding section 24. Each of the first and second folding sections are living hinges in which the elastomeric material forming the membrane 14 is somewhat thinner than the surrounding material, thereby making the material at the living hinge more susceptible to folding than the surrounding material. While the living hinge is formed by use of a thinner section of material in the preferred embodiment, it should be understood that the folding sections can be produced in other means in order to manufacture a location that is more likely to bend or fold than other areas.

The relatively uniform section 23 is illustrated as having a generally consistent thickness across its length between the first and second folding sections. Alternatively, this central section need not be uniform, but rather is preferably formed such that it generally resists folding more than the first and second folding sections.

Each of the collapsible containers is preferably dimensionally arranged as depicted in FIG. 17. Thus, a first vertical length $l_1$ is defined as the distance between the top of the rim of the container and the first folding section 22. A second vertical length $l_2$ is defined as the distance between the first folding section and the second folding section. A third vertical length $l_3$ is defined as the distance between the lowest part of the base and the second folding section. Each of these lengths when expressed as a "vertical length" is measured as a vertical distance above a horizontal surface upon which the container is resting.

In the preferred form, each of the lengths $l_1$, $l_2$, and $l_3$ is approximately the same in magnitude, dividing the container into thirds. Consequently, when the container is collapsed the height of the container is approximately one-third of its original height. In other forms of the invention, each of the three vertical heights is at least one-quarter of the overall height of the container when expanded.

In addition, the location of the second folding section 24 and the length of the central section 23 as defined by $l_2$ are such that at least a portion of the base 20 extends below the flexible membrane 14 when the container is in the collapsed position. This relationship ensures that the container is resting on the base even when collapsed, reducing the stress on the living hinge during storage.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A collapsible container, comprising:
   a substantially rigid rim formed from a first material, the rim having a top edge and a downwardly extending portion which extends downwardly and inwardly below the top edge to form an upper sidewall portion of the container;
   a substantially rigid base, the base having a bottom edge configured for resting on a horizontal surface and an upwardly extending portion which extends upwardly and outwardly above the bottom edge to form a lower sidewall portion of the container; and
   a flexible membrane formed from a second material which is more flexible than the first material and having an upper end permanently secured to the rim and a lower end permanently secured to the base, the flexible membrane having a central section and only two living hinges, the living hinges comprising a first living hinge and a second living hinge, the first living hinge being relatively closer to the rim, and the second living hinge being relatively closer to the base;
   wherein the flexible membrane is formed from silicone and the base is formed from metal, the base further defining a floor of the container wherein the flexible membrane extends upwardly and outwardly from the base, the base further comprising a metal wire mesh material to define a plurality of drainage pathways through the floor;
   the container further defining a height from the bottom edge of the base to the top edge of the rim, the first and second living hinges being positioned to divide the height into three portions, including a first portion between the top edge of the rim and the first living hinge, a second portion between the first living hinge and the second living hinge, and a third portion between the second living hinge and the bottom edge of the base;
   whereby the container is configurable in either a first position in which the container is expanded and a second position in which the container is fully collapsed, the container in the fully collapsed position being folded at the first living hinge and the second living hinge, the flexible membrane being devoid of folds or bends between the first living hinge and the second living hinge.

2. The collapsible container of claim 1, wherein the rim is formed from metal, the container further comprising a handle extending from the rim.

3. The collapsible container of claim 1, wherein the flexible membrane is devoid of holes.

4. A collapsible container, comprising:
   a substantially rigid rim formed from a first material, the rim having a top edge and a downwardly extending portion which extends downwardly and inwardly below the top edge to form an upper sidewall portion of the container;
   a substantially rigid base, the base having a bottom edge configured for resting on a horizontal surface and an upwardly extending portion which extends upwardly and outwardly above the bottom edge to form a lower sidewall portion of the container; and
   a flexible membrane formed from a second material which is more flexible than the first material and having an upper end permanently secured to the rim and a lower end permanently secured to the base, the flexible membrane having a central section and only two living hinges, the living hinges comprising a first living hinge and a second living hinge, the first living hinge being relatively closer to the rim, and the second living hinge being relatively closer to the base;
   the container further defining a height from the bottom edge of the base to the top edge of the rim, the first and second living hinges being positioned to divide the height into three portions, including a first portion between the top edge of the rim and the first living hinge, a second portion between the first living hinge and the second living hinge, and a third portion between the second living hinge and the bottom edge of the base;

whereby the container is configurable in either a first position in which the container is expanded and a second position in which the container is fully collapsed, the container in the fully collapsed position being folded at the first living hinge and the second living hinge, the flexible membrane being devoid of folds or bends between the first living hinge and the second living hinge;

wherein the base comprises a tube having a first end secured to the lower end of the flexible membrane and a second end extending away from the lower end of the flexible membrane, the tube having a diameter and the rim having a diameter, wherein the diameter of the tube is less than the diameter of the rim.

5. A collapsible container, comprising:

a rigid base having a downwardly-extending foundation with a bottom surface for providing stable support for the container on a horizontal surface, the rigid base further having an upwardly-extending portion and a plurality of through-holes extending through the base;

a rigid rim formed from a first material and having an upper edge defining an open top of the container and a downwardly extending portion; and a flexible membrane formed from a second material which is more flexible than the first material and having an upper end permanently secured to the downwardly-extending portion of the rim and a lower end permanently secured to the upwardly-extending portion of the base to form a sidewall of the container, the flexible membrane extending upwardly and outwardly from the base to the rim and being formed from the second material of sufficient thickness such that the flexible membrane will support the rigid rim, the flexible membrane further having a first weakened region adjacent the rim and a second weakened region adjacent the base;

the container further defining a container height from the bottom surface of the foundation to the upper edge of the rim, the first and second weakened regions being positioned to divide the container height into three portions, including a first portion between the upper edge of the rim and the first weakened region, a second portion between the first weakened region and the second weakened region, and a third portion between the second weakened region and the bottom surface of the foundation, each of the first portion, second portion, and third portions being at least one quarter of the height of the container;

the downwardly extending portion of the rigid rim further terminating adjacent the first weakened region such that a majority of the height of the first portion comprises the rigid rim and wherein the rigid downwardly extending portion forms an upper portion of the sidewall of the container, the downwardly extending portion of the rigid rim further terminating at a point downward and inward from the open top of the container;

the upwardly extending portion of the rigid base further extending outwardly continuously as it extends upwardly and terminating adjacent the second weakened region such that a majority of the height of the third portion comprises the rigid base, the upwardly extending portion of the rigid base further extending upward to form a lower portion of the sidewall of the container;

whereby the container is configurable in either a first position in which the container is expanded and a second position in which the container is fully collapsed when the flexible membrane is folded at the first weakened region and the second weakened region, the container in both the fully collapsed position and the expanded position having no folds between the first weakened region and the second weakened region.

6. The container of claim 5, wherein when a perimeter of the first weakened region is substantially greater than a perimeter of the second weakened region, whereby the second portion of the container is inclined upwardly and inwardly from the first weakened region to the second weakened region when the container is in the collapsed position, and further wherein the base is rounded as it extends outwardly and upwardly to the flexible membrane.

7. The container of claim 5, wherein the rim is formed from a metal material.

8. The container of claim 7, wherein the base defines a floor of the container, the base further comprising a metal wire mesh material to define a plurality of drainage pathways through the floor.

9. The container of claim 5, wherein the flexible membrane is devoid of through-holes.

10. The container of claim 5, wherein when the container is in the second position, the bottom surface of the foundation extends below the second weakened region.

11. The container of claim 5, wherein the rim further comprises an arm, the arm being moveable between a laterally extended position and a retracted position, whereby the rim and the arm cooperate to provide support for the container when the arm is in the extended position and the container is suspended across a sink.

* * * * *